Nov. 22, 1938.                    E. GINN                    2,137,802
INTAKE MANIFOLD
Filed April 17, 1937
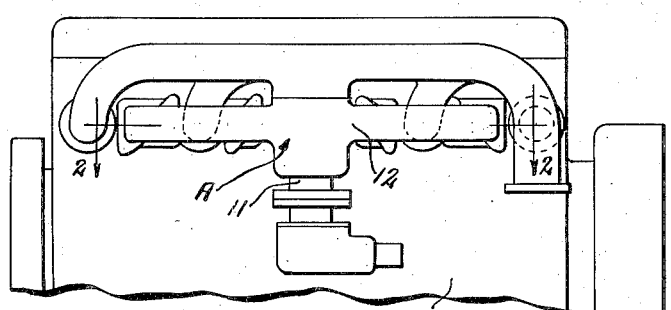
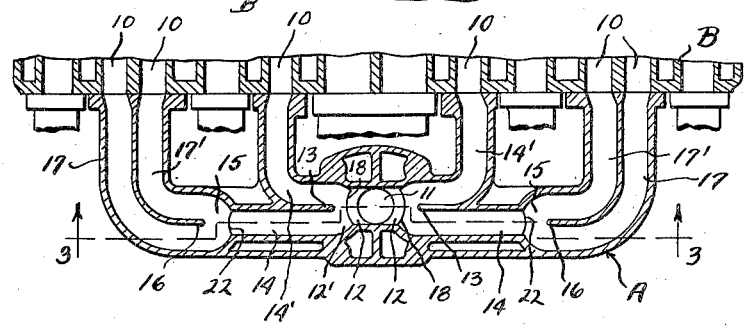
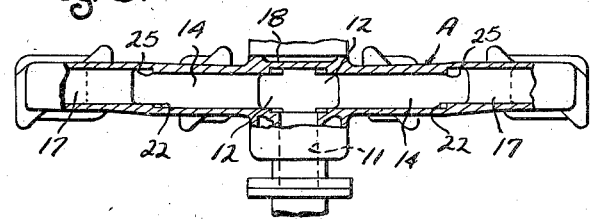
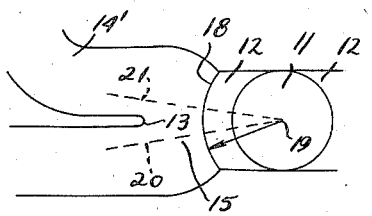
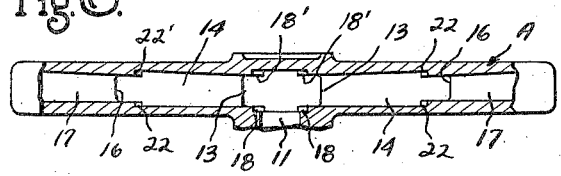
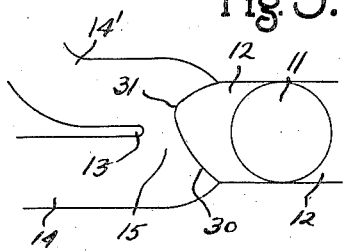
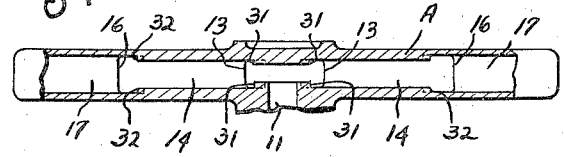
INVENTOR.
Earl Ginn
BY
ATTORNEY.

Patented Nov. 22, 1938

2,137,802

UNITED STATES PATENT OFFICE 2,137,802

INTAKE MANIFOLD

Earl Ginn, North Muskegon, Mich., assignor to Continental Motors Corporation, Detroit, Mich., a corporation of Virginia Application April 17, 1937, Serial No. 137,488

20 Claims. (Cl. 123—52)

My invention relates to an intake manifold structure for an internal combustion engine and more particularly to an intake manifold comprising conducting portions for connection with individual cylinder intake ports.

In the present type of engines, and more particularly those in which ordinary fuels are used, it is found that there is considerable precipitation of wet fuel on the walls of the intake manifold. Furthermore, this wet fuel precipitate is caused to flow toward the engine in said conducting portions of the intake manifold structure and difficulty is sometimes experienced in uniformly distributing the wet fuel to the engine cylinders.

It is customary in intake manifold designs for multi-cylinder engines to employ a manifold provided with a split or dividing means which is so constructed as to uniformly divide the fuel and insure a uniform distribution of fuel into the secondary fuel mixture conducting portions leading to the engine intake ports. It has been found difficult to so control a stratified wet fuel flow so as to divide same to insure uniform wet fuel distribution.

An object of my present invention is to provide an improved intake manifold structure which is provided with wet fuel flow controlling means operable to insure the uniform distribution of wet fuel to the engine cylinders.

A further object of my present invention is to provide a dam, a shoulder or other suitable means acting upon the wet fuel flowing along a wall of the lateral fuel mixture conducting portion to direct said wet fuel flow into one or the other of the secondary fuel mixture conducting portions in accordance with variations in the suction pressure induced in said secondary conducting portions during engine operation.

The fuel mixture flowing through a manifold carries a certain amount of wet fuel in suspension, and on flowing this fuel mixture around a bend, the uniform or equalized flow of same is disturbed and the wet fuel will be precipitated on the walls of the manifold beyond the bend at most any point, at one place at one engine speed and another place at another speed. It is therefore an object of the present invention to obtain substantially uniform distribution of this wet fuel precipitate by incorporating control means therefor which will function to obtain such uniform distribution preferably after said fuel mixture flow has attained substantial equilibrium by providing certain definite control points or stages. The combustible fluid is first passed around a bend, then flows through a closed conduit which is of sufficient length to permit the fuel mixture flow to attain equilibrium; it is then acted upon by said fuel impeding means, reatomized to a large extent on flowing into a distributing zone, and is then divided by means of a split and caused to flow into separate conducting portions beyond the distributing zone. If necessary the fuel mixture may again be divided one or more times and distributed into additional secondary conducting portions.

For a more detailed understanding of my invention, reference may be had to the accompanying drawing which illustrates one form which my invention may assume, and in which:

Fig. 1 is a fragmentary side elevational view of an internal combustion engine showing my improved intake manifold structure in elevation assembled therewith, Fig. 2 is a horizontal sectional view of the intake manifold structure taken substantially on the line 2—2 of Fig. 1, Fig. 3 is a vertical longitudinal sectional view of the intake manifold structure taken substantially on the line 3—3 of Fig. 2, Fig. 4 is an enlarged diagrammatic view of a portion of the intake manifold structure showing the relationship of the component parts of the structure, Fig. 5 is an enlarged diagrammatic view of a modified construction, Fig. 6 is a vertical longitudinal sectional view of an intake manifold structure illustrating a modified construction, and Fig. 7 is a vertical longitudinal sectional view of an intake manifold structure illustrating a further modified construction.

The present application is a continuation in part of my application Serial No. 47,152 filed October 28, 1935.

For purposes of illustration I have chosen to show my improved intake manifold structure A assembled with a multi-cylinder internal combustion engine B of the type having intake passages 10, one for each engine cylinder. Obviously the exact number of engine cylinders is immaterial to the present invention since a manifold structure embodying the principles of my invention may be incorporated with engines other than of the particular type as herein illustrated, and further an intake manifold of the present construction may be advantageously employed with engines having Siamese ports.

The intake manifold structure shown in the preferred embodiment of my invention comprises in general a primary fuel mixture conducting portion 11 connected with a lateral fuel mixture conducting portion 12. Said lateral conducting portion extends longitudinally of the engine and to both sides of the primary conducting portion and is preferably provided with a zone of enlarged cross-sectional area at a point spaced longitudinally from the junction of said lateral and primary conducting portions. Thus the lateral conducting portion of the intake manifold structure terminates into an enlarged portion in which is located a vertical split 13 which substantially bisects the enlarged portion of the lateral conducting portion and thereby provides two secondary fuel mixture conducting portions 14 and 14' respectively lying on opposite sides of said split 13. It may be noted that the splits 13 are preferably aligned axially relative to the axes of said lateral and primary fuel mixture conducting portions.

In the construction illustrated in the accompanying drawing I have preferably provided further division of the secondary branch or conducting portion 14, said secondary conducting portion 14 terminating in an enlarged portion 15 in which is located a split 16 providing a pair of further secondary portions 17 and 17', said splits 16 being also preferably aligned axially with respect to the axis of the runners 14.

It will be noted that the splits 13 and 16 act on the fuel mixture for dividing the fuel mixture flow in such a manner as to insure uniform distribution of the fuel mixture into said secondary conducting portions. In order to insure the proper distribution of said fuel precipitated on the walls of said lateral conducting portion, I have preferably provided means which consist preferably of dams or shoulders which extend transversely of the lateral conducting portion. More particularly the lateral conducting portion 12 is provided with a dam 18 located approximately at the junction of said lateral conducting portion 12 and the enlarged portion or zone of greater cross-sectional area 12'. This dam may extend across the floor of the manifold and also, if desired, may extend transversely across the roof of the manifold as shown in Fig. 3. This dam in the present embodiment of my invention is constructed substantially arcuate and as shown in Fig. 4, it will be noted that the dam is struck on an arc having a center 19 which substantially coincides with the center axis of the primary conducting portion. The center of this arc is arranged to preferably lie in a vertical longitudinal plane through the intake manifold structure which contains the longitudinal axis of the lateral conducting portion as well as the split 13. The split is thus arranged to substantially bisect the enlarged portion of the lateral fuel mixture conducting portion of the manifold structure and faces toward the lateral conducting portion. This dam is preferably arranged in advance of the split and is so constructed as to influence the wet fuel flow in such a manner as to provide for uniform wet fuel distribution.

In Fig. 3 it will be noted that the floor and roof of the lateral runner are provided with dams 18, and the roof of said lateral runner is constructed to provide a shoulder 25 or drop-off opposite to the dam 22 adjacent to and cooperatively associated with the split 16.

In Fig. 6 the floor and roof of the lateral runner are provided with arcuate dams, those on the floor being indicated by the reference characters 18 and 22 and those on the roof being indicated by the reference characters 18' and 22'.

In Fig. 7, however, it will be noted that the lateral runner 30 is provided with shoulders 31 on both the floor and roof in advance of the split 13, and is further provided with shoulders 32 on both the floor and roof in advance of the split 16.

It may be observed that both shoulders and dams function satisfactorily in providing a control of the wet fuel flow along the roof and floor of the lateral runner. In some cases shoulders will be used in preference to the dams, while in other instances the dams and shoulders will both be used. More particularly the dams and shoulders may both be termed wet fuel impeding means, though in one case the wet fuel must climb over the impeding means, while in the other case, the wet fuel slips over the edge of the shoulder. Therefore in my claims where I have reference to impeding means, it will be observed that both shoulders and dams lie within the scope of the claims.

The operation of the arcuate dam or shoulder in conjunction with the split and secondary conducting portion is as follows. The secondary conducting portions 14 and 14' are opened to engine suction at different times and thus one or the other of said secondary conducting portions is exposed to more suction pressure than the other during engine operation. When the secondary conducting portions 14 are opened to engine suction it will be observed that the wet fuel flowing along the wall 19 of said lateral conducting portion is induced to flow generally to the direction as indicated by the dotted line 20 (see Fig. 4). When the suction pressure falls in the secondary conducting portion due to the closing of the engine intake port connected therewith and the suction pressure in the secondary conducting portion 14' is increased due to the opening of the engine intake port connected with the latter secondary conducting portion, the suction pressure influences the flow of the wet fuel in such a manner as to cause the same to flow generally in a direction as indicated by the dotted line 21 (see Fig. 4).

The secondary lateral conducting portion 14 terminates in an arcuate dam 22 (Figs. 3 and 6) or shoulder 32 as in Fig. 7 located approximately at the junction of said conducting portion 14 and the enlarged portion 15. The action of this dam 22 or shoulder 32 is similar to the action of the dam 18, the wet fuel flowing over the dam or shoulder being directed into one or the other of said secondary conducting portions 17 and 17', depending upon which of said portions is exposed or connected with engine suction pressure.

It will be noted that the present manifold construction provides for a stratified fuel flow which is so directed as to flow into either one or the other of said secondary conducting portions, whichever one is connected at the moment with the engine suction pressure. In view of the fact that this stratified fuel flow is directed substantially towards the axis of each secondary conducting portion, there is no tendency of the concentrated wet fuel flow to flow into the secondary conducting portion which is connected with an engine cylinder whose intake port is closed at the moment and thus each of said secondary conducting portions obtains full benefit from the wet fuel flow during the period in which it is opened to engine suction pressure, and substantially uniform quantities of wet fuel are conveyed or introduced into all of said secondary conducting portions, thereby tending to improve engine performance and general engine efficiency.

It will be noted that the flow of wet fuel over a dam or a shoulder tends to induce a stratified fuel mixture flow beyond the dam or shoulder substantially along the axis of the conducting portion beyond said dam or shoulder. The shoulders as well as the dams may be termed wet fuel impeding means, and both the dams and shoulders have a generally concave contour facing the primary fuel mixture conducting means.

In Fig. 5, I have illustrated an arcuate dam or shoulder 30 of irregular curvature, and it will be noted that this dam or shoulder as viewed in plan has a peak or apex 31 located to one side of the split 13. In this way, one can pre-arrange the manifold structure so as to facilitate wet fuel flow into one branch more than into the other branch, and as illustrated the wet fuel will flow more readily into branch 14' than into branch 14.

It will be noted that the fuel mixture flow on rounding the bend at the junction of the primary conducting portion 11 and runner 12, is disturbed and the wet fuel carried in suspension may be precipitated most anywhere on the walls of the lateral conducting portion 12. I prefer to locate the dam 18 or shoulder 31 or other suitable wet fuel flow impeding means at a predetermined distance from said junction, so that the fuel mixture flow will attain substantially equilibrium and very little if any of the wet fuel particles held in suspension will be precipitated beyond said dam or shoulder. Thus, the wet fuel precipitate is collected in runner 12 and reatomized by the dam or shoulder or is caused to flow toward the engine cylinder in which suction pressure is produced. Thus the split acts on a fuel mixture flow after it has attained equilibrium and a predetermined distribution of the fuel mixture and wet fuel precipitate into runners 14 and 14' is obtained.

Said fuel mixture flow is again disturbed when being divided by the split 13 so I have provided a second conduit 14 of sufficient length so as to permit the fuel mixture flow to attain equilibrium again prior to being acted upon by the second split 16. Because of the fact that the wet fuel particles, which are held in suspension by the fuel mixture flowing in the closed conduit 14, are precipitated on the walls of conduit 14 at most any place, the dam 22 or shoulder 32 is so located as to act on the wet fuel precipitate when substantially all is precipitated, which precipitation substantially occurs during the time said fuel mixture flows through conduit 14 and after the fuel mixture flow attains equilibrium. Thus the location of the dam or shoulder is important for it is preferred to have the dam or shoulder act on all said wet fuel precipitate in order that a predetermined distribution of a maximum amount of said wet fuel precipitate may be obtained. The splits, together with the said dams and shoulders cooperate to provide for proper distribution of the fuel mixture and wet fuel precipitate to the engine cylinders.

It will be apparent to those skilled in the art to which my invention pertains that various modifications and changes may be made therein without departing from the spirit of my invention or from the scope of the appended claims.

What I claim as my invention is:

1. An engine induction system having in combination, a primary fuel mixture conducting portion, a lateral conducting portion, and a plurality of secondary conducting portions connected with said lateral conducting portion, a split intermediate said secondary conducting portions, and an arcuate dam having a generally concave contour facing toward the primary fuel mixture conducting portion and extending transversely across the floor of said lateral conducting portion in advance of said split.

2. An engine induction system comprising a lateral fuel mixture conducting portion, a primary fuel mixture conducting portion connected with said lateral conducting portion, said lateral conducting portion having a zone of enlarged area at a point spaced from the junction of said primary and lateral conducting portions, a plurality of secondary fuel mixture conducting portions connected with said zone of enlarged area and separated by a split, and a dam extending transversely of said lateral conducting portion approximately at the junction of said zone of enlarged area with said remaining portion of the lateral conducting portion.

3. An engine induction system comprising a lateral fuel mixture conducting portion, a primary fuel mixture conducting portion connected with said lateral conducting portion, said lateral conducting portion having a zone of enlarged area at a point spaced from the junction of said primary and lateral conducting portions, a plurality of secondary fuel mixture conducting portions connected with said zone of enlarged area and separated by a split, and an arcuate dam extending transversely of said lateral conducting portion approximately at the junction of said zone of enlarged area with said remaining portion of the lateral conducting portion.

4. An engine induction system comprising a lateral fuel mixture conducting portion, a primary fuel mixture conducting portion connected with said lateral conducting portion, said lateral conducting portion having a zone of enlarged area at a point spaced from the junction of said primary and lateral conducting portions, a plurality of secondary fuel mixture conducting portions connected with said zone of enlarged area and separated by a split, and an arcuate dam extending transversely of the roof and floor of said lateral conducting portion approximately at the junction of said zone of enlarged area with said remaining portion of the lateral conducting portion.

5. An engine induction system comprising a lateral fuel mixture conducting portion, a primary fuel mixture conducting portion connected with said lateral conducting portion, said lateral conducting portion having a zone of enlarged area at a point spaced from the junction of said primary and lateral conducting portions, a plurality of secondary fuel mixture conducting portions connected with said zone of enlarged area and separated by a split, and an arcuate dam extending transversely of the roof and floor of said lateral conducting portion approximately at the junction of said zone of enlarged area with said remaining portion of the lateral conducting portion, said arcuate dams having centers substantially coinciding with the central vertical longitudinal plane of said lateral conducting portion.

6. An engine induction system comprising a lateral fuel mixture conducting portion, a primary fuel mixture conducting portion connected with said lateral conducting portion, said lateral conducting portion having a zone of enlarged area at a point spaced from the junction of said primary and lateral conducting portions, a plurality of secondary fuel mixture conducting portions connected with said zone of enlarged area and separated by a split, and an arcuate dam extending transversely of the roof and floor of said lateral conducting portion approximately at the junction of said zone of enlarged area with said remaining portion of the lateral conducting portion, said arcuate dams having centers lying in a plane containing the axes of said lateral and primary conducting portions.

7. An engine induction system comprising a lateral fuel mixture conducting portion, a primary fuel mixture conducting portion connected with said lateral conducting portion, said lateral conducting portion having a zone of enlarged area at a point spaced from the junction of said primary and lateral conducting portions, a plurality of secondary fuel mixture conducting portions connected with said zone of enlarged area and separated by a split, and an arcuate dam extending transversely of the roof and floor of said lateral conducting portion approximately at the junction of said zone of enlarged area with said remaining portion of the lateral conducting portion, said arcuate dams having centers lying in the vertical longitudinal plane through said lateral conducting portion containing said split.

8. An engine induction system including a primary fuel mixture conducting portion, a lateral fuel mixture conducting portion terminating in an enlarged portion, a split facing said lateral conducting portion and substantially bisecting said enlarged portion, a pair of secondary fuel mixture conducting portions communicating with said enlarged portion and respectively located on opposite sides of said split, and means including wet fuel impeding means located in advance of said split and acting on the wet fuel flowing along a wall of said lateral conducting portion to concentrate substantially all the wet fuel flow in one or the other of said secondary conducting portions in response to increased suction pressure in one of said secondary conducting portions relative to the other, said wet fuel impeding means comprising an arcuate dam whose generally concave contour faces said primary fuel mixture conducting portion.

9. An engine induction system including a lateral fuel mixture conducting portion terminating in an enlarged portion, a split facing said lateral conducting portion and substantially bisecting said enlarged portion, a pair of secondary fuel mixture conducting portions communicating with said enlarged portion and respectively located on opposite sides of said split, and an arcuate dam extending transversely of a wall of said lateral conducting portion and acting on the wet fuel flowing along said wall to direct same into one or the other of said secondary conducting portions in response to suction pressure developed in said secondary conducting portions.

10. An engine induction system having in combination, a primary fuel mixture conducting portion, a lateral conducting portion, and a plurality of secondary conducting portions constructed in open communication with said lateral conducting portion, a split intermediate said secondary conducting portions, and an arcuate shoulder having a generally concave contour facing toward the primary fuel mixture conducting portion and extending transversely across a wall of said lateral conducting portion in advance of said split.

11. An engine induction system having in combination, a primary fuel mixture conducting portion, a lateral conducting portion, and a plurality of secondary conducting portions constructed in open communication with said lateral conducting portion, a split intermediate said secondary conducting portions, one or more of said secondary conducting portions being branched to form additional conducting portions, splits arranged to lie intermediate said branched conducting portions, and wet fuel flow impeding means located substantially in advance of each of said splits and comprising one or more shoulders and dams each having a generally concave contour facing toward the primary fuel mixture conducting portion and extending transversely across a wall of said lateral conducting portion in advance of said splits.

12. An engine induction system having in combination, a primary fuel mixture conducting portion, a lateral conducting portion comprising one or more zones of fuel distribution connected with a plurality of branch conducting portions, and wet fuel impeding means associated with each said zones of fuel distribution and comprising one or more shoulders and dams extending transversely across a wall of said lateral conducting portion.

13. An engine induction system having in combination, a primary fuel mixture conducting portion, a lateral conducting portion comprising one or more zones of fuel distribution connected with a plurality of branch conducting portions, and wet fuel impeding means associated with each said zones of fuel distribution and comprising shoulders extending transversely across both the floor and roof of said lateral conducting portion.

14. An engine induction system having in combination, a primary fuel mixture conducting portion, a lateral conducting portion comprising one or more zones of fuel distribution connected with a plurality of branch conducting portions, and wet fuel impeding means associated with each said zones of fuel distribution and comprising a dam extending transversely across one wall portion of said lateral conducting portion and a shoulder extending transversely across another wall of said lateral conducting portion.

15. An engine induction system having in combination, a primary fuel mixture conducting portion, a lateral conducting portion connected at an angle with said primary conducting portion, said lateral conducting portion providing a closed conduit of a length sufficient to permit the fuel mixture flowing therethrough to attain substantial equilibrium, said lateral conducting portion terminating in a zone of fluid distribution, a plurality of branch conducting portions connected with said zone of fluid distribution and providing a split for dividing said fluid flow, and a wet fuel impeding means acting to reatomize the wet fuel precipitate flowing into said zone of fluid distribution, said impeding means being located adjacent to the outlet of said conduit whereby to act on said fuel precipitate after the fuel mixture flow in said conduit has attained substantial equilibrium.

16. An engine induction system having in combination, a primary fuel mixture conducting portion, a lateral conducting portion connected at an angle with said primary conducting portion, said lateral conducting portion providing a closed conduit of a length sufficient to permit the fuel mixture flowing therethrough to attain substantial equilibrium, said lateral conducting portion terminating in a zone of fluid distribution, a plurality of branch conducting portions connected with said zone of fluid distribution and providing a split for dividing said fluid flow, and an arcuate dam extending transversely across a wall of said lateral conducting portion and located adjacent to the outlet of said conduit, whereby to act on said fuel precipitate to reatomize same after the fuel mixture flow in said conduit has attained substantial equilibrium.

17. An engine induction system having in combination, a primary fuel mixture conducting portion, a lateral conducting portion connected at an angle with said primary conducting portion, said lateral conducting portion providing a closed conduit of a length sufficient to permit the fuel mixture flowing therethrough to attain substantial equilibrium, said lateral conducting portion terminating in a zone of fluid distribution, a plurality of branch conducting portions connected with said zone of fluid distribution and providing a split for dividing said fluid flow, and an arcuate shoulder extending transversely across a wall of said lateral conducting portion and located adjacent to the outlet of said conduit, whereby to act on said fuel precipitate to reatomize same after the fuel mixture flow in said conduit has attained substantial equilibrium.

18. An engine induction system having in combination, a primary fuel mixture conducting portion, a lateral conducting portion connected at an angle with said primary conducting portion, said lateral conducting portion providing a closed conduit of a length sufficient to permit the fuel mixture flowing therethrough to attain substantial equilibrium, said lateral conducting portion terminating in a zone of fluid distribution, a plurality of branch conducting portions connected with said zone of fluid distribution and providing a split for dividing said fluid flow, and a wet fuel impeding means actng to reatomize the wet fuel precipitate flowing into said zone of fluid distribution, said impeding means being located adjacent to the outlet of said conduit whereby to act on said fuel precipitate after the fuel mixture flow in said conduit has attained substantial equilibrium, one or both of said branch conducting portions poviding a secondary closed conduit of a length sufficient to permit the fuel mixture flowing therethrough to attain substantial equilibrium and terminating in a second zone of fluid distribution, a plurality of second branch conducting portions connected with said second zone of fluid distribution and providing a second split for dividing said fluid flow, and a second wet fuel impeding means acting to reatomize the wet fuel precipitate flowing into said second zone of fluid distribution, said second impeding means being located adjacent to the outlet of said secondary conduit, whereby to act on said fuel precipitate after the fuel mixture flow in said secondary conduit has attained substantial equilibrium.

19. An engine induction system having in combination, a primary fuel mixture conducting portion, a lateral conducting portion connected at an angle with said primary conducting portion, said lateral conducting portion providing a closed conduit of a length sufficient to permit the fuel mixture flowing therethrough to attain substantial equilibrium, said lateral conducting portion terminating in a zone of fluid distribution, a plurality of branch conducting portions connected with said zone of fluid distribution and providing a split for dividing said fluid flow, and a wet fuel impeding means acting to reatomize the wet fuel precipitate flowing into said zone of fluid distribution, said impeding means being located adjacent to the outlet of said conduit whereby to act on said fuel precipitate after the fuel mixture flow in said conduit has attained substantial equilibrium, one or both of said branch conducting portions providing a secondary closed conduit of a length sufficient to permit the fuel mixture flowing therethrough to attain substantial equilibrium and terminating in a second zone of fluid distribution, a plurality of second branch conducting portions connected with said second zone of fluid distribution and providing a second split for dividing said fluid flow, and a second wet fuel impeding means acting to reatomize the wet fuel precipitate flowing into said second zone of fluid distribution, said second impeding means being located adjacent to the outlet of said secondary conduit, whereby to act on said fuel precipitate after the fuel mixture flow in said secondary conduit has attained substantial equilibrium, said first and second impeding means being arcuate and having their concave contour facing toward their associated conduit inlets.

20. In an engine induction system, the method of distributing combustible fluid to individual engine cylinders consisting in flowing a fuel mixture around a bend and into a closed conduit of sufficient length to permit the fuel mixture flow passing therethrough to attain equilibrium, in flowing said fluid into a fluid distributing zone and then subsequently dividing said fluid for conduction through separate conducting portions, and in passing the wet fuel precipitated in said conduit over a wet fuel flow impeding means at the conduit outlet for reatomizing at least some of the wet fuel on flowing same from said conduit into said distributing zone and for substantially directing the flow of same into the conducting portion beyond said distributing zone open at the time to engine suction pressure.

EARL GINN.